United States Patent [19]

Häusler

[11] Patent Number: 4,884,025
[45] Date of Patent: Nov. 28, 1989

[54] PROCESS FOR THE FAULT MONITORING OF AN ELECTRIC VALVE

[75] Inventor: Michael Häusler, Weilheim, Fed. Rep. of Germany

[73] Assignee: Asea Brown Boveri AG, Baden, Switzerland

[21] Appl. No.: 54,433

[22] Filed: May 26, 1987

[30] Foreign Application Priority Data

Jun. 6, 1986 [CH] Switzerland ............... 2301/86

[51] Int. Cl.⁴ .................. G08B 21/00; H02H 7/10
[52] U.S. Cl. .................. 324/158 SC; 340/635; 363/68
[58] Field of Search ........ 324/158 SC, 158 D, 158 T; 364/645, 653; 340/514, 516, 645, 644, 635; 363/68, 54, 57, 58

[56] References Cited

U.S. PATENT DOCUMENTS

| | | | |
|---|---|---|---|
| 3,342,337 | 10/1974 | Ekström et al. | 321/27 R |
| 4,025,845 | 5/1977 | Lhommelet et al. | 340/653 X |
| 4,471,301 | 9/1984 | Duwo et al. | 324/158 SC |
| 4,633,241 | 12/1986 | Casteel et al. | 324/158 SC |
| 4,675,800 | 6/1987 | Seki et al. | 363/68 |
| 4,685,045 | 8/1987 | Baraban et al. | 340/645 X |

FOREIGN PATENT DOCUMENTS 1057891 11/1983 U.S.S.R. ............... 324/158 SC
1161734 8/1969 United Kingdom .

OTHER PUBLICATIONS

Camenzind, "Improved Circuits for Testing SCR's", Electronic Industries; Jun. 1965; pp. 93–95.
Willcox; "Thyristor Tester"; Television (GB), vol. 25, No. 8, Jun. 1975, pp. 368–370.

Primary Examiner—Reinhard J. Eisenzopf
Assistant Examiner—Vinh P. Nguyen
Attorney, Agent, or Firm—Werner W. Kleeman

[57] ABSTRACT

With electric valves (7) having several series-connected thyristors (T1 ... Tn; T1' ... Tn'), individual thyristors may become defective, so that they do not withstand the blocking voltage applied to them. For the simplified checking of such defects, a process is specified which does not require any individual monitoring on the spot, i.e. for high potential. For this purpose, in the blocked state of the valve (7), all thyristors of one current direction, apart from at least one thyristor being tested, are triggered within a predeterminable triggering interval. If a valve current ($i_R$) then flows, an indicating and registering device (A1 ... An) indicates in which thyristor stage the defect has occurred. This status check is preceded by a preliminary test in which it is checked whether all thyristor triggering channels are in order. All thyristors are triggered in this test. If no valve current ($i_R$) occurs, a triggering channel fault signal ($S_{UD}$) is generated.

18 Claims, 2 Drawing Sheets

4,884,025

PROCESS FOR THE FAULT MONITORING OF AN ELECTRIC VALVE

BACKGROUND OF THE INVENTION

The present invention relates to a new and improved process for fault monitoring of an electric valve containing at least two series-connected thyristors.

According to a process for fault monitoring of an electric valve such as known, for example, from the GEC Journal of Science and Technology, Vol. 48, No. 3, 1982, pp. 135–140, a 12-pulse bridge circuit for 270 kV, 1852 A (500 MW), 125 thyristors per valve are connected in series. Two 4-kV thyristors of 56 mm diameter are connected in parallel on each thyristor level. With 24 valves, the thyristor failure rate during 25 a is to be less than 0.1 per year. The triggering signals for each thyristor are transmitted via optical waveguides. The fault status of each thyristor level is indicated there by a luminescent diode. It is monitored whether the thyristors still are able to block and whether a break-over diode repeatedly responds. Such a response of the break-over diode indicates a fault in the triggering channel; the information can be transmitted to the remote control station at ground potential.

Owing to the generation of the fault status signals at high potential and the double conversion of the signals (electrical-optical-electrical), this monitoring system is expensive and too complex, in particular for magnetically triggered valves where triggering is via pulse transformers. Optical waveguides for information transmission may break.

In thyristor protection circuits such as known, for example, from the German Company Periodical "BBC Nachrichten" (BBC News), Vol. 59, No. ¾ (1977), pages 152 through 158, break-over diodes, so-called BOD elements are utilized.

For actuating thyristors, it is known to use a triggering pulse control unit such as known, for example, from IFAC Control In Power Electronics and Electrical Drives, Lausanne, Switzerland, 1983, pages 493 through 500, in particular page 500, FIG. 5.

SUMMARY OF THE INVENTION

Therefore, with the foregoing in mind it is a primary object of the present invention to provide a new and improved process for fault monitoring of electrical valves containing at least two thyristors and which process is not afflicted with the drawbacks and limitation of the prior art processes.

Another significant object of the present invention is directed to a new and improved process for fault monitoring of electrical valves containing at least two series-connected thyristors and which process can be carried out using a considerably simpler manner of fault-indicating signal transmission as compared to the prior art processes.

A further important object of the present invention is directed to a new and improved process for fault monitoring of electrical valves containing at least two series-connected thyristors and which process does not require multiple signal conversion on special signal lines for transmitting the fault status from each thyristor stage or level to a control station at ground potential.

Now in order to implement these and still further objects of the invention, which will become more readily apparent as the description proceeds, the fault monitoring process of the pressent development is manifested, among others things, by the steps that, in a blocked state of the electric valve, the at leat two series-connected thyristors associated with one current direction are triggered with the exception of at least one thyristor within a pedetermined triggering interval.

It is one advantage of the inventive process that the elimination of signal lines dispenses with one source of faults. This consequently achieves a higher availability of the valve. By avoidance of the complex process of thyristor monitoring on the spot, and thus of the expenditure for signal transmission from high potential to ground, costs are also saved. Instead of many individual measurements (thyristor voltages), a single measurement (valve current) suffices.

In an advantageous further development of the inventive process, it is checked whether all thyristor triggering channels are in order in a preliminary test before the status monitoring of an individual thyristor or a thyristor stage is non-periodically monitored. In the blocked state of the electric view, the at least two thyristors associated with the one current direction are then triggered and a triggering channel fault signal is generated if no valve current subsequently flows through the electric valve. In this manner, all thyristors can be monitored in a simple way for any triggering channel defects. This means no increased voltage stress of the thyristors in a normal case, but only in the case of a triggering channel defect. Since the check is not carried out periodically and the fault is immediately detected, this increased stress can be tolerated.

Preferably, in the presence of at least one break-over element having a predetermined break-over voltage, the at least one thyristor or thyristor stage is triggered when the voltage at such thyristor or thyristor stage exceeds the break-over voltage. Such triggering may also take place at a test voltage smaller than the break-over voltage of the break-over element. In this manner, the individual overvoltage protection of the thyristors or thyristor stages enable carrying out the status monitoring operation for the intact thyristors without any risk thereto.

Advantageously a triggering channel fault signal is generated if the harmonic currents of the valve current through the electric valve exceeds a predetermined limiting value for such harmonic current. This has the advantage that, with a valve connected in series with a capacitor, all triggering channels can be checked for faults in the triggered valve state, i.e. periodically. As soon as, in the triggered state, a triggerIng channel is defective (no regular triggering pulse at a thyristor), a periodic break-over element triggering of the defective thyristor takes place, the valve triggering moment being delayed altogether slightly. This results in the excitation of harmonic currents of natural frequency of the capacitor bank, which is switched by the valve, in some cases in all three valve branches of a three-phase system. To determine periodic break-over element triggering, all that is then required is analysis of the current of one of the three alternating current phases.

In a further advantageous manner of carrying out the inventive process, the triggering of the at least two thyristors takes place at a test triggering angle according to the equation:

$$\alpha_p = 180° - \arcsin((k \cdot n_p \cdot U_K)/\sqrt{2} \cdot U)),$$

wherein:

k is a safety factor <1, in particular=0.7, $n_p$ the number of deliberately not triggered thyristors, $U_K$ the break-over voltage of a break-over element, and U an effective no-load voltage.

There is thus achieved the beneficial effect that, in a valve connected in series with a choke, undesirable valve triggerings, i.e. those resulting in false alarms, are reliably avoided in the range above the break-over voltage of a break-over element.

In the case of an electric valve which is operated in connection with a constantly charged capacitor bank, the thyristors or thyristor stages are selectively triggered at a test triggering angle according to the equation:

$$a_p = 90° + \arccos(1 - \Delta U/(\sqrt{2} \cdot U)),$$

wherein, U is a positive effective no-load voltage and $\Delta U$ is a minimum triggering voltage, or the equation:

$$a_p = 270° + \arccos(1 - \Delta U/(\sqrt{2} \cdot U)),$$

wherein U is a negative effective no-load voltage and $\Delta U$ the minimum triggering voltage.

In a preferred further development of the inventive process, each thyristor or thyristor stage is checked by a cyclic interchange or sequence of the triggering pulses such that at least one thyristor or thyristor stage does not receive a triggering pulse in successive checking cycles. There is thus made possible a complete check of all n thyristor levels within n/2 periods of the system voltage with a valve in series connection with a choke and within n perios with a valve in series connection with a capacitor.

Preferably, the duration of the aforementioned triggering pulses is in the range of 5 ms to 200 ms. Such short-time triggering pulses ensure that no undesirable triggering can occur in the range of valve voltage >- break-over voltage.

In the case of magnetically triggered electric valves or thyristor switches, a triggering pulse is not delivered until the electric valve voltage is at least 100 V and smaller than $k \cdot n_p \cdot U_K$, wherein k is a safety factor smaller than 1, in particular equal to 0.7, $n_p$ represents the number of deliberately not triggered thyristors or thyristor stages, and $U_k$ is the break-over voltage of the respective break-over element. There is thus enabled a particularly simplified status monitoring. Determining the moment at which to deliver the test trigger is particularly simple if the capacitor voltage in the blocked state of the valve always has approximately the same value. This is the case if the capacitors are periodically recharged to the peak value of the system voltage via the thyristors of the correct current direction (dependent on the polarity of the capacitor voltage). In this case, the test trigger pulse can be derived from the phase relationship of the system voltage. The valve voltage need no longer be measured inorder to determine the correct triggering moment.

In the case of status monitoring an electric valve in series connection with a capacitor, there is obtained the advantage that the electric valve can be a thyristor switch in which each thyristor is connected in anti-parallel with either a further thyristor or a diode, such as in so-called semi-controlled electrical valves.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
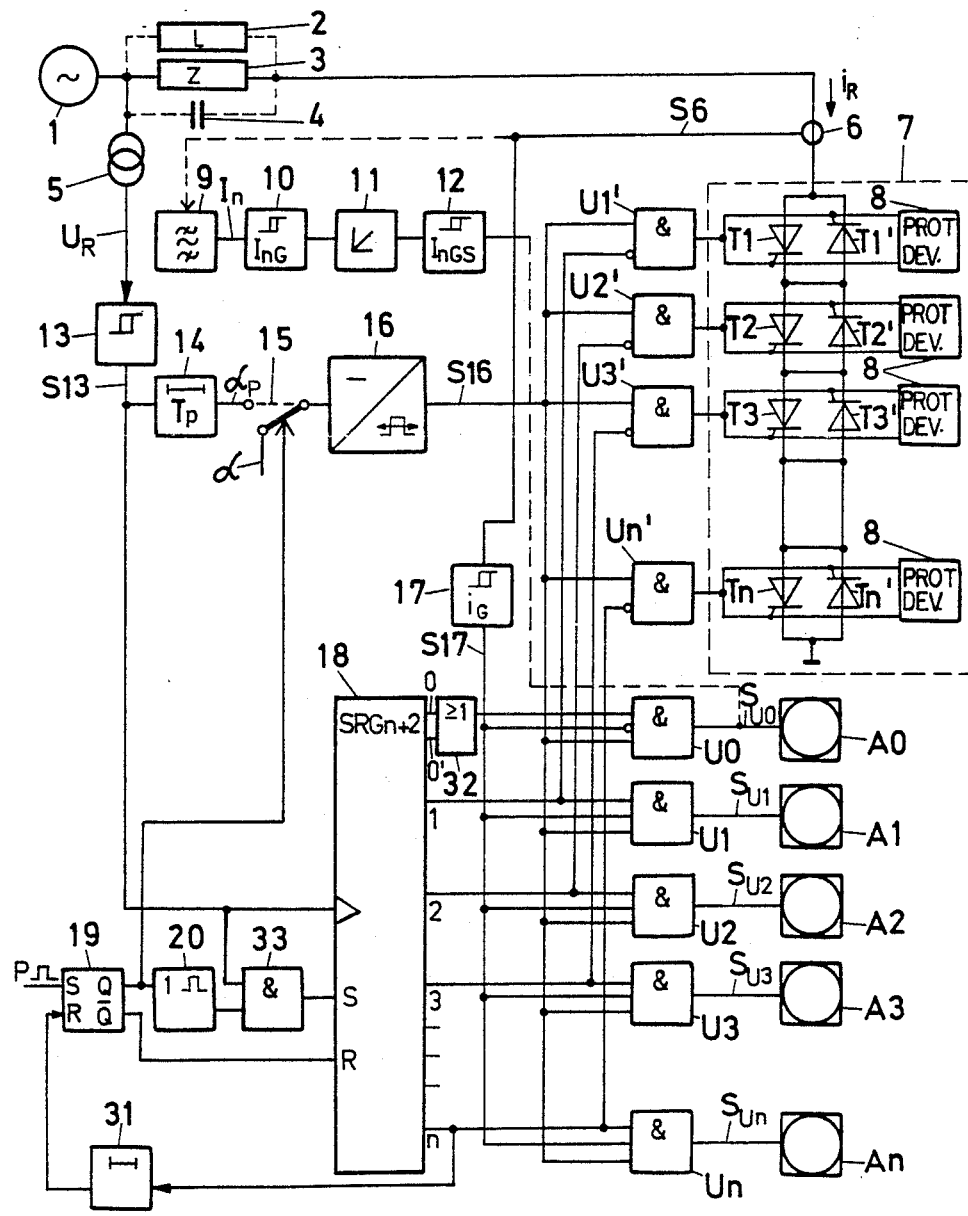
FIG. 1 shows a test circuit for fault monitoring of an electric valve with voltage-dependent protection devices for each thyristor level or stage of the valve.

Describing now the drawings, it is to be understood that only enough of the construction of the test circuit for fault monitoring of an electrical valve has been shown as is needed for those skilled in the art to readily understand the underlying principles and concepts of the present development, while simplifying the showing of the drawings. Turning attention now specifically to FIG. 1 of the attached drawings, the test circuit illustrated therein by way of example and not limitation will be seen to comprise an electric valve or a thyristor switch or controller 7 of a static reactive-power compensation system for a single-phase AC system with an AC voltage source 1, which can be connected to ground potential via a reactor 3, a current transformer 6, for the detection of a valve current $i_R$, and the electric valve 7. The reactor 3 can, as connected by broken lines, be an inductive resistor or a choke 2 or a capacitor or a capacitor bank 4.

The AC switch 7 has n unipolar, series-connected thyristors T1, T2 . . . Tn, a thyristor T1', T2' . . . Tn' being connected in antiparallel with each of these thyristors. In the event that the reactor 3 is a capacitor 4, instead of an antiparallel thyristor, an antiparallel diode may be used.

Figure 2:
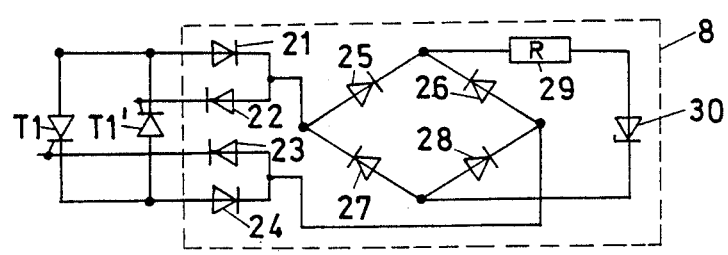
FIG. 2 shows the protective triggering device used in the test circuit according to FIG. 1.

Every two such antiparallel-connected semi-conductor components form a thyristor stage which is connected to a voltage-dependent protective device 8, shown more closely in FIG. 2. If the AC voltage at a thyristor stage exceeds a predeterminable value, the break-over voltage $U_K$, cf. FIG. 7, a protective triggering signal is applied to the control inputs of the two thyristors of the thyristor stage. The normal triggering of the thyristors T1 . . . Tn, T1' . . . Tn' of the thyristor switch 7 takes place by means of a triggering pulse control unit 16, which is common to all and at ground potential, and the output signal S16 of which is applied to first inputs of n AND gates U1', U2' ... Un'. Each thyristor stage is assigned an AND gate, the output of the respective AND gate being connected to the control signal inputs of the two thyristors of the thyristor stage via optical waveguides and an optical signal converter (not shown). Second, negated inputs of the AND gates U1' ... Un' are connected to succesive outputs 1 ... n of a shift register 18. The utputs 1 ... n of the shift register 18 are, furthermore, in each case connected to a first input of an AND gate U1, U2 ... Un, the output signals $S_{U1}$ ... $S_{Un}$ of which are applied to indicating and registering devices A1 ... An. Furthermore, a first output, denoted by 0, and a second output, denoted by 0', of the shift register 18 are connected via an OR gate 32 to a first input of an AND gate U0, the output signal $S_{U0}$ of which is applied to an indicating and registering device A0.

The output signal S6 of the current transformer 6 is monitored in an AC comparator 17 for exceeding of a predeterminable current limit value $i_G$ of preferably $\geq 1\%$ of the nominal current of $i_R$. The output of the AC comparator 17 is connected to a negated second input of the AND gate U0 and to non-negated second inputs of the AND gates U1 ... Un. Furthermore, the output of the triggering pulse control unit 16 is connected to non-negated third inputs of the AND gates U0 ... Un. The output of the current transformer 6 is, furthermore, as indicated by broken lines, connected to the input of the indicating and registering device A0 via a bandpass filter 9, a filter current comparator 10, an integrator 11 and a further comparator 12. The bandpass filter 9 is tuned to a pass frequency $$f = \sqrt{LC}/2\pi$$

where L=inductance of the damping choke (not shown) in the supply line to the thyristor switch and C=capacitance of the capacitor bank 4 (per phase with a multiphase AC voltage source 1). On the output side, the bandpass filter 9 delivers a harmonics-containing filter current $I_n$ where $n=f/f_N$, $f_N=50$ Hz=system frequency. This filter current $I_n$ is monitored in the filter current comparator 10 for exceeding of a predeterminable filter current limit value $I_{nG}$ of preferably 10% of the nominal current of $i_R$. The integrator 11 serves to delay the output signal of the filter current comparator 10 by a predeterminable period, in order to suppress a transient response of the filter current comparator 10. The comparator 12 monitors the output signal of the integrator 11 for exceeding of a predeterminable total filter current limit value $I_{nGS}$, which characterizes a periodic triggering of thyristors of the AC switch 7 by the protective triggering device 8 and is indicated in the indicating and registering device A0.

The AC voltage $U_R$ of the AC voltage source 1 is applied to an AC voltage zero detector 13 via a voltage transformer 5. In the event that the reactor 3 is a choke 2, an AC voltage zero detector 13 whose output signal S13 assumes the value "1" at every voltage passage through zero is used. If the reactor 3 is a capacitor 4, an AC voltage zero detector 13 is used whose output signal S13 only assumes the value "1" if $U_R=0$ and, simultaneously, $dU_R/dt>0$, i.e. at every 0° passage through zero.

The output of the AC voltage zero detector 13 is connected to the input of the triggering pulse control unit 16, via a delay element 14 with predeterminable delay $T_p$ and an electronic switch 15 and is also connected to the clock input of the shift register 18 and to a first input of an AND gate 33. The delay $T_P$ corresponds to a test triggering angle $\alpha_P$, which defines the test triggering moment for the thyristors T1 ... Tn, T1' ... Tn'. The test triggering moment is to be chosen such that a valve voltage applied at the thyristor switch 7 is $U_7<k\cdot n_P\cdot U_K$, k=safety factor $<1$, preferably=0.7, $n_P$=number of the intentionally not-triggered thyristors, $U_K$=protective voltage of a thyristor stage.

If the thyristor switch 7 is connected in series with a capacitor 4, it must be additionally ensured that sufficient triggering voltage is available, preferably a minimum triggering voltage of 100 V. In this respect, the following relationship applies for the test triggering angle $\alpha_P$:

$$\alpha_P = 90° + \arccos(1 - \Delta U/(\sqrt{2U})) \text{ for } U_C > 0 \text{ and}$$
$$\alpha_P = 270° + \arccos(1 - \Delta U/(\sqrt{2U})) \text{ for } U_C < 0$$

where $U_C$=capacitor voltage, U=effective no-load voltage $U_{R(max)}/2$ (phase-phase), $\Delta U$=minimum triggering voltage, $\alpha=0$ for $U=0$ (beginning of a system period).

If the thyristor switch 7 is connected in series with a choke 2, the normal range for a triggering angle $\alpha$ is given by the relationship: $90°<\alpha<180°$. The following applies for the test triggering angle $\alpha_P$:

$$\alpha_P = 180° - \arcsin((k \cdot n_P \cdot U_K)/(\sqrt{2U})).$$

Table 1 gives the valve voltage $U_7$ at the thyristor switch 7, the test triggering angle $\alpha_P$ and the valve current $i_R$ for the status monitoring of a thyristor switch 7 in series with a choke 2, for a nominal current of $i_R=2560\cdot\sqrt{2}$ A.

TABLE 1

| | | $\alpha_P$ | | $i_R$ | |
| | | Electrical Degrees | | A | |
| Example | $U_7$ kV | 1 blocking thyristor | 2 blocking thyristors | 1 blocking thyristor | 2 blocking thyristors |
|---|---|---|---|---|---|
| 1 | 16.3 | 173 | 166 | 31 | 127 |
| 2 | 7.39 | 164 | 147 | 128 | 536 |
| 3 | 4.86 | 156 | 125 | 293 | 1330 |

Table 2 gives the valve voltage $U_7$, the test triggering angle $\alpha_P$ and the safety margin for the status monitoring of a thyristor switch 7 in series with a capacitor 4.

TABLE 2

| Example | $U_7$ kV | $\alpha_P$ Electrical Degrees | Safety Margin ms |
|---|---|---|---|
| 1 | 16.3 | 95 | 1.5 |
| 2 | 7.29 | 98 | 2.0 |
| 3 | 4.86 | 100 | 2.5 |

The protective voltage $U_K$ was 4 kV. The triggering pulse must disappear at a sufficiently early time (about 500 μs) before expiry of the safety margin.

During the test, the switch 15 is in the position indicated by broken lines, otherwise in the position indicated by solid lines, the presetting of the normal triggering angle α coming from a control device (not shown), as is known for example for German Patent Specification, 2,653,333. The triggering angle α can be used to adjust with infinite variability the reactive power of the static reactive-power compensator.

19 denotes an RS bistable element, to the setting input of which a test start signal P is applied by an operator or by a master control device (not shown). The resetting input of the RS bistable element 19 is connected to the n output of the shift register 18 via a delay element 31 with predeterminable time delay of, for example, a quarter period of the system voltage. The delay is chosen such that a fault in the nth thyristor stage can still be reliably indicated and stored. The Q output signal of the RS bistable element 19 is applied on the one hand via a monostable, non-retriggerable bistable element 20 to a second input of the AND gate 33, and on the other hand to the switch 15, which is in the position indicated by broken lines while Q="1". The output of the AND gate 33 is connected to a setting input S of the shift register 18. The duration of the output signal "1" of the bistable element 20 is chosen such that only one signal S13="1" can set a "1" in the shift register 18 via its setting input. The Q output of the RS bistable element 19 is connected to the resetting input of the shift register 18. Q="1" sets the output 0 . . . n of the shift register 18 to "0".

In FIG. 2, identical parts are provided with the same reference symbols as in FIG. 1. 21-28 denote diodes, 29 denotes an ohmic resistance and 30 denotes a break-over diode with a predeterminable break-over voltage $U_K$ of, for example, 4 kV. If the break-over voltage $U_K$ is exceeded, the voltage breaks down at the break-over diode 30 and the break-over diode becomes conductive.

In the event that the anode of T1 and the cathode connected to it of T1' are positive, the cathode of T1 and the anode connected to it of T1' are negative and the voltage at this thyristor stage is $>U_K$, the control electrode of T1 is supplied with biasing current via the components 21, 25, 29, 30, 38 and 23, and thus the thyristor T1 is triggered.

With opposite potential at the thyristor stage, the control electrode of T1' is supplied with biasing current via the components 24, 26, 29, 30, 27 and 22, and thus the thyristor T1' is triggered.

Figure 4:
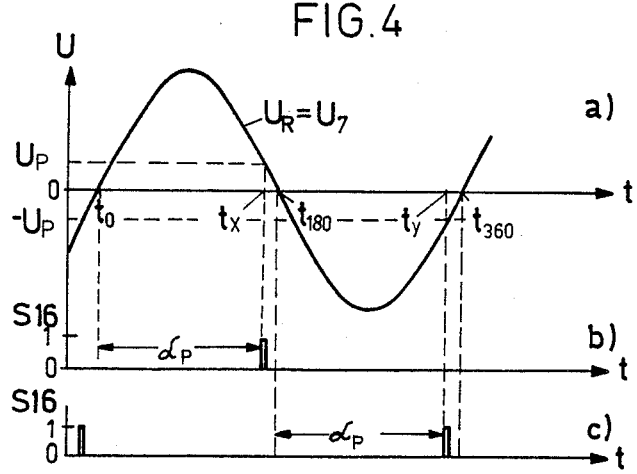
FIG. 4 shows signal representations a–c of the AC voltage and of the triggering pulses for a series connection according to FIG. 3.
Figure 3:
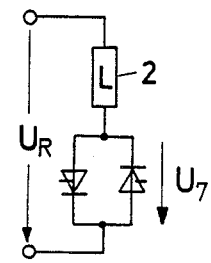
FIG. 3 shows voltage conditions in the series connection of the electric valve or thyristor switch and a choke.

In the following, the function of the test circuit is to be explained in connection with FIGS. 3-8. In FIGS. 4, 6 and 7, voltage U is plotted on the ordinate and time t is plotted on the abscissa. FIGS. 4, 4, 6 and 7 show triggering signals S16 as a function of time t.

Testing of a valve 7 in series connection with a choke

Testing is carried out sporadically; with a thyristor switch 7 in series with a choke 2 only when the normal control circuit is interrupted for the duration of monitoring and the valve is blocking, in particular at night.

Preliminary tests (function of the triggering channels)

Before a status check of the individual thyristor stages is carried out, it is established in a preliminary test whether all triggering channels are in order, i.e. whether all thyristors in one current direction trigger at the triggering moment. Then a current has to flow through the valve 7 for approximately half a system period. The preliminary test is explained in connection with FIGS. 3 and 4, a choke 2 being connected in series with the valve 7 and the AC voltage $U_R$ being equal to the valve voltage $U_7$. To initiate the preliminary test, a short test start signal P is applied to the setting input S of the RS bistable element 19. This makes Q="1", and causes a "1" signal to be applied to the output of the bistable element 20. If then a signal S13="1" arrives at the shift register 18 from the AC voltage zero detector 13, for example when there is a 0° zero passage at moment $t_0$, a "1" is set in the shift register, applied to its 0 output and thus to the first input of the AND gate U0. With Q="1", the switch 15 is directed into the position illustrated by broken lines. After a period Tp, corresponding to the triggering angle $α_p$, the triggering pulse control unit 16 delivers a triggering signal S16="1" at moment $t_x$ with a valve voltage $U_7=U_p$, cf. FIGS. 4 and 4, to the AND gates U1'-Un' and to the AND gate U0. Since the outputs 1-n of the shift register have the logical value "0" at this moment, the negated, second inputs of the AND gates U1'-Un' are prepared, i.e. at logical "1", so that the triggering signal S16 triggers all positively biased thyristors T1 . . . Tn, provided that the triggering channels are in order. There then flows a valve current $i_R$, so that the AC current comparator 17 responds. The output signal S17 of the latter assumes the logical value "1" and holds its output signal $S_{U0}$ at "0" via the negated second input of the AND gate U0. If one of the thyristors T1 . . . Tn has not triggered, no valve current flows, and $S_{U0}$="1" causes a triggering channel fault indication in the indicating and registering device A0 and is stored there. The third input of the AND gate U0 is delayed, in order that no triggering channel fault signal $S_{U0}$="1" can occur between the arrival of the triggering signal S16="1" and the arrival of the signal S17="1".

In the event that, instead of the 0° zero passage, the AC voltage zero detector 13 has detected a 180° zero passage at moment $t_{180}$, there is consequently positive potential at the thyristor T1' . . . Tn', so that these thyristors receive a triggering pulse at the moment $t_y$ with a test voltage $-U_p$, cf. FIG. 4. The zero passage of $U_R$ at the moment $t_{360}$ again corresponds to that at the moment $t_0$.

Both events described are cases of the first voltage zero passage of the preliminary test. With the next, i.e. the second, voltage zero passage of $U_R$, S13="1" generates a clock signal for the shift register 18, which causes its output 0' to become "1" and all other outputs have the logical value "0". In this state, the second thyristor half is triggered and checked, i.e. if, for example, the thyristors T1 . . . Tn are triggered during the first voltage zero passage, the thyristors T1' . . . Tn' are triggered during the second voltage zero passage. Thus, a half period of the system AC voltage is required per valve branch for preliminary testing. With intact triggering channels, a small valve current flows during this time.

Status check (testing for thyristor defects)

The preliminary test is followed by the status check for thyristor defects in the individual thyristor stages. In the voltage range $U_p<U_K$, all thyristors apart from one in each case are briefly triggered by the triggering pulse control unit 16 at the test triggering angle $α_p$.

With the third clock pulse S13="1", the output 1 of the shift register 18 becomes "1", while all other outputs have the logical value "0". This causes the AND gate U1' to block via its negated second input, while the AND gates U2' . . . Un' allow the triggering signals S16="1" to pass, so that the thyristor stages T2, . . . Tn, Tn'T2' ... receive triggering pulses, but not the thyristor stage T1, T1'. If the thyristor stage T1, T1' is in order, no valve current $i_R$ flows, otherwise the AC comparator 17 responds and generates, via the prepared AND gate U1, a status error signal $S_{U1}$"1", which is indicated and registered in the indicating and registering device A1.

With the subsequent 4th zero passage of $U_R$, and thus 4th clock pulse, the output 2 of the shift register 18 is set to the logical value "1" etc. up to output n, whereby all thyristor stages are successively checked. Once the last output n has assumed the logical value "1", the shift register 18 is reset via the delay element 31 and the RS bistable element 19 to its original state, in which all outputs 0, 0', 1 ... n have the logical value "0"—until a new test. At the same time, the switch 15 is brought into its normal position, indicated by solid lines.

A defective thyristor represents a short-circuit. The indicating and registering devices A1 ... An indicate the thyristor stage in which the short-circuit occurred. Provided that only one thyristor stage is reported defective, in general operation of the valve can be allowed to continue, since usually at least one redundant thyristor stage per valve is provided. Altogether, the status check takes n half-periods for one single-phase valve.

With a three-phase system, checking can be carried out in parallel with each phase conductor, so that at most one system period more is necessary for the entire status check. During the period of the preliminary test and the status check, the valve 7 is not available for normal operation. If the valve is intact, no current flows during the status check.

Testing of a valve 7 in series connection with a capacitor

Figure 5:
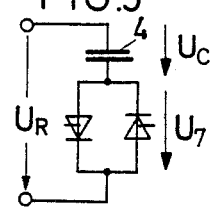
FIG. 5 shows voltage conditions in the series connection of the electric valve or thyristor switch and a capacitor.
Figures 6, 7:
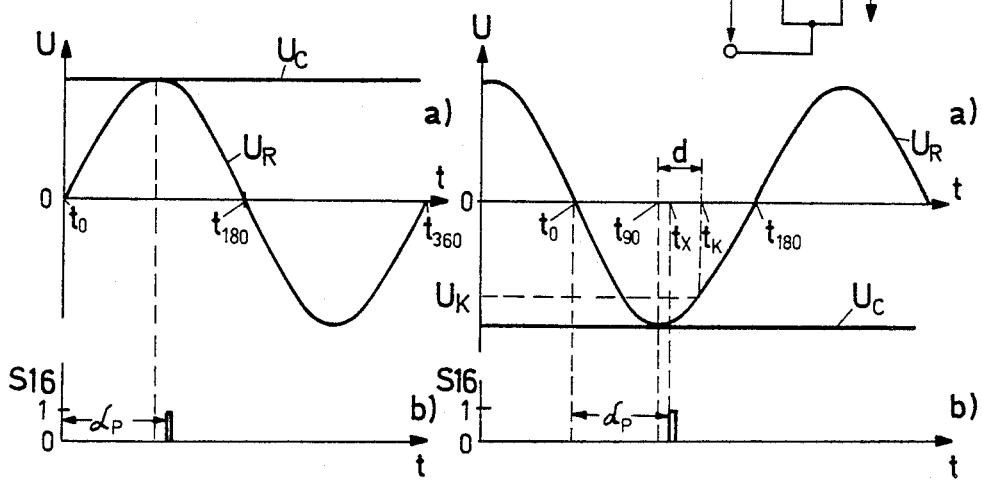
FIG. 6 shows signal representations a–b of the AC voltage and of the triggering pulses for a series connection according to FIG. 4 with positive capacitor voltage.
FIG. 7 shows signal representations a–b corresponding to FIG. 6 with negative capacitor voltage.

FIG. 5 shows the voltages with such a circuit. After disconnection, the valve voltage $U_7$ displays a profile corresponding to a $(1-\cos \omega t)$ function, cf. for example the Swiss Company Periodical Brown Boveri Mitteilungen (Brown Boveri Information) 3 (1982) pp. 85-89, in particular p. 87. In this case, there is a time domain or triggering time interval d in which the momentary valve voltage $U_7$ is smaller than the permissible thyristor voltage or smaller than $U_K$, cf. FIG. 7.

Preliminary test

Method (a);

Let us assume that the valve 7 was conductive a short time ago and was blocked. The valve 7 is subsequently briefly triggered in the time domain d described, with $U_7<U_K$. With intact triggering channels, the valve 7 must trigger and carry the full current for a half period (with semi-controlled valves, for one period), which can take place by monitoring of the valve current $i_R$ in the way described above. This test is possible at any time during normal operation as soon as the valve has been normally blocked by the triggering pulse control unit 16. One period is required for testing.

Figure 8:
FIG. 8 shows a signal representation of the AC voltage at an AC switch with harmonics which are caused by periodic triggering of a break-over element of the protective device according to FIG. 2.

Method (b):

This method is based on determination of the fact that, with defective triggering channel, retriggering has to take place via the break-over diode 30 and consequently harmonic current of the natural resonance of the capacitor bank is induced, cf. FIG. 8. This method does not require any intervention in the valve control, but merely presupposes that the valve 7 is switched on for a sufficiently long time (a number of system periods), for reliable recognition.

In the event of a periodic protective triggering, the output signal of the comparator 12 has the logical value "1", so that the indicating and registering device A0 indicates a triggering channel fault.

Status check

Presupposing that all triggering channels are functioning properly, the status check can be carried out as described before in the same voltage range with $U_7<U_K$. A maximum of n system periods are required for the check. The check may be made during normal operation as soon as the triggering pulse control unit 16 has effected a normal disconnection of the capacitor bank 4. If thyristors are defective, the check results in current flowing for a full period in each case.

Instead of having a common triggering signal supply for both thyristors of a thyristor stage, an individual triggering signal supply may be provided for each thyristor.

It goes without saying that the functions described above of the test circuit can be accomplished by a high-speed computer.

With a large number of series-connected thyristors, it may be advantageous in the status check not to apply a triggering signal to two test thyristors at the same time.

While there are shown and described present preferred embodiments of the invention, it is to be distinctly understood that the invention is not limited thereto, but may be otherwise variously embodied and practiced within the scope of the following claims.

What I claim is:

1. In a process for fault monitoring an electric valve containing at least two series-connected thyristors, the process comprising the steps of:
   triggering, during a blocked state of the electric valve, the at least two series-connected thyristors associated with a predetermined current direction with the exception of at least one thyristor to be tested of said at least two series-connected thyristors within a predetermined time interval;
   detecting a valve current flowing through the electric valve during said predetermined time interval;
   presetting a current limit value for said detected valve current;
   comparing said detected valve current flowing through said electric valve during said predetermined time interval, with said preset current limit value; and
   generating a fault signal indicative of a fault in said at least one thyristor to be tested whenever said detected valve current exceeds said preset current limit value.

2. The process as defined in claim 1, further including the steps of:
   conducting a preliminary test prior to triggering said at least two series-connected thyristors, each said thyristor being associated with a triggering channel;
   during said preliminary test, checking whether all thyristor triggering channels are in order; and
   during said checking of said thyristor triggering channels in said blocked state of said electric valve, triggering said at least two series-connected thyristors associated with said predetermined current direction and generating a triggering channel fault signal in the absence of current flow through said electric valve.

3. The process as defined in claim 1, further including the step of:
  series connecting, as said at least two thyristors, a plural number of thyristors and thereby forming said electric valve; and
  selectively connecting each one of said plural number of thyristors in anti-parallel with either one of (i) a further thyristor or (ii) a diode.

4. In a process for fault monitoring an electric valve containing at least two series-connected thyristors, the process comprising the steps of:
  triggering, during a blocked state of the electric valve, the at least two series-connected thyristors associated with a predetermined current direction with the exception of at least one thyristor to be tested of said at least two series-connected thyristors within a predetermined time interval; and
  detecting a valve current flowing through the electric valve during said predetermined time interval;
  Presetting a current limit value for said detected valve current;
  Comparing said detected valve current flowing through said electric valve during said predetermined time interval, with said preset current limit value; and
  Generating a fault signal indicative of a fault in said at least one thyristor to be tested whenever said detected valve current exceeds said preset current limit value;

5. The process as defined in claim 4, wherein:
  said step of triggering said at least two series-connected thyristors includes triggering said at least two series-connected thyristors at a predetermined test triggering angle according to the equation:

$$\alpha_p = 180° - \arc\sin((k \cdot n_p \cdot U_K)/(\sqrt{2} \cdot U)),$$

wherein k is a safety factor smaller than 1, $n_p$ is the number of said at lest one thyristor to be tested, $U_K$ is a predetermined break-over voltage defined by said break-over element, and U is an effective no-load voltage.

6. The process as defined in claim 4, wherein:
  said step of triggering said at least two series-connected thyristors entails selectively triggering said at least two series-connected thyristors at a predetermined test triggering angle according to the equation:

$$\alpha_p = 90° + \arc\cos(1 - \Delta U/(\sqrt{2} \cdot U)),$$

wherein U is a positive effective no-load voltage, and $\Delta U$ is a minimum triggering voltage, or according to the equation:

$$\alpha_p = 270° + \arc\cos(1 - \Delta U/(\sqrt{2} \cdot U)),$$

wherein U is a negative effective no-load voltage, and $\Delta U$ is said minimum triggering voltage.

7. The process as defined in claim 4, further including the steps of:
  series-connecting a choke with the electric valve;
  said step of triggering said at least two series-connected thyristors including the step of triggering said at least two series-connected thyristors at a predetermined test triggering angle according to the equation $$\alpha_p = 180° - \arc\sin((k \cdot n_p \cdot U_K)/(\sqrt{2} \cdot U)),$$

wherein k is a safety factor smaller than 1, $n_p$ is the number of said at least one thyristor to be tested, $U_K$ is a predetermined break-over voltage defined by said break-over element, and U is an effective no-load voltage, selectively at a predetermined test triggering angle according to the equation $$\alpha_p = 90° + \arc\cos(1 - \Delta U/(\sqrt{2} \cdot U)),$$

wherein U is a positive effective no-load voltage, and $\Delta U$ is a minimum triggering voltage, or at a predetermined test triggering angle according to the equation $$\alpha_p = 270° + \arc\cos(1 - \Delta U/(\sqrt{2} \cdot U)),$$

wherein U is a negative effective no-load voltage, and $\Delta U$ is the minimum triggering voltage;
  said step of triggering said at least two series-thyristors associated with said predetermined current direction entails applying a multiple number of triggering pulses for multiply triggering a plural number of said series-connected thyristors associated with said predetermined current direction and constituting said electric valve;
  during said multiple triggering operation, sequentially exempting from triggering, as said at least one thyristor to be tested, at least one of said plural number of said thyristors for testing in order to thereby sequentially test all of said plural number of series-connected thyristors during a cycle of triggering and testing operations;
  carrying out at least once said cycle of triggering and testing operations;
  selecting as said triggering pulse, a triggering pulse having a duration of 100 microseconds in the event of magnetic triggering and a triggering pulse having a duration of 10 microseconds in the event of optical triggering;
  delivering said triggering pulse once the electric valve reaches an electric valve voltage of at least 100 V;
  selecting as said electric valve voltage a value smaller than $k \cdot n_p \cdot U_K$, wherein k is said safety factor smaller than 1, $n_p$ is the number of said at least one thyristor to be tested, and $U_K$ is a predetermined break-over voltage defined by said break-over element; and
  selectively connecting each one of said plural number of series-connected thyristors in anti-parallel with either one of (i) a further thyristor or (ii) a diode.

8. The process as defined in claim 7, further including the step of:
  setting said safety factor at a value of k=0.7.

9. In a process for fault monitoring an electric valve containing at least two series-connected thyristors, the process comprising the steps of:
  triggering, during a blocked state of the electric valve, the at least two series-connected thyristors associated with a predetermined current direction with the exception of at least one thyristor to be tested of said at least two series-connected thyristors within a predetermined time interval; and
  detecting a valve current flowing through the electric valve during said predetermined time interval;
  Presetting a current limit value for said detected valve current;

Comparing said detected valve current flowing through said electric valve during said predetermined time interval, with said preset current limit value; and Generating a fault signal indicative of a fault in said at least one thyristor to be tested whenever said detected valve current exceeds said present current limit value;

in an electric valve in which each one of said at least two series-connected thyristors is connected to a break-over element defining a predetermined break-over voltage, said step of triggering said at least two series-connected thyristors entails triggering each one of said at least two series-connected thyristors at an applied test voltage smaller than said predetermined break-over voltage defined by said break-over element.

10. In a process for fault monitoring an electric valve containing at least two series-connected thyristors, the process comprising the steps of:

triggering, during a blocked state of the electric valve, the at least two series-connected thyristors associated with a predetermined current direction with the exception of at least one thyristor to be tested of said at least two series-connected thyristors, within a predetermined time interval;

conducting a preliminary test prior to triggering said at least two series-connected thyristors, each said thyristor being associated with a triggering channel;

during said preliminary test, checking whether all thyristor triggering channels are in order;

during said checking of said thyristor triggering channels in said blocked state of said electric valve, triggering said at least two series-connected thyristors associated with said predetermined current direction and generating a triggering channel fault signal in the absence of current flow through said electric valve; and in an electric valve in which each one of said at least two series-connected thyristors is connected to a break-over element defining a predetermined break-over voltage, said step of triggering said at least two series-connected thyristors entails triggering each one of said at least two series-connected thyristors at an applied voltage exceeding said predetermined break-over voltage defined by said break-over element.

11. In a process for fault monitoring an electric valve containing at least two series-connected thyristors, the process comprising the steps of:

triggering, during a blocked state of the electric valve, the at least two series-connected thyristors associated with a predetermined current direction with the exception of at least one thyristor to be tested of said at least two series-connected thyristors within a predetermined time interval;

conducting a preliminary test prior to triggering said at least two series-connected thyristors, each said thyristor being associated with a triggering channel;

during said preliminary test, checking whether all thyristor triggering channels are in order;

during said checking of said thyristor triggering channels in said blocked state of said electric valve, triggering said at least series-connected thyristors associated with said predetermined current direction and generating a triggering channel fault signal in the absence of current flow through said electric valve; and in an electric valve in which each one of said at least two series-connected thyristors is connected to a break-over element defining a predetermined break-over voltage, said step of triggering said at least two series-connected thyristors entails triggering each one of said at least two series-connected thyristors at an applied test voltage smaller than said predetermined break-over voltage defined by said break-over element.

12. In a process for fault monitoring an electric valve containing at least two series-connected thyristors, the process comprising the steps of:

triggering, during a blocked state of the electric valve, the at least two series-connected thyristors associated with a predetermined current direction with the exception of at least one thyristor to be tested of said at least two series-connected thyristor within a predetermined time interval;

in an electric valve in which each one of said at least two series-connected thyristors is connected to a break-over element defining a predetermined break-over voltage, said step of triggering said at least two series-connected thyristors entails triggering each one of said at least two series-connected thyristors at an applied voltage exceeding said predetermined break-over voltage defined by said break-over element;

generating a triggering channel fault signal;

said step of generating said triggering channel fault signal entailing the steps of:

applying to a filter an electric valve current which flows through said electric valve after triggering said at least two series-connected thyristors;

filtering, by means of said filter, a harmonic from said electric valve current;

comparing said harmonic with a predetermined limiting harmonic value; and generating said triggering channel fault signal when said harmonic exceeds said predetermined limiting harmonic value.

13. In a process for fault monitoring an electric valve containing at least two series-connected thyristors, the process comprising the steps of:

triggering, during a blocked state of the electric valve, the at least two series-connected thyristors associated with a predetermined current direction with the exception of at least one thyristor to be tested of said at least two series-connected thyristors within a predetermined time interval;

conducting a preliminary test prior to triggering said at least two series-connected thyristors, each said thyristor being associated with a triggering channel;

during said preliminary test, checking whether all thyristor triggering channels are in order;

during said checking of said thyristor triggering channels in said blocked state of said electric valve, triggering said at least two series-connected thyristors associated with said predetermined current direction and generating a triggering channel fault signal in the absence of current flow through said electric valve;

in an electric valve in which each one of said at least two series-connected thyristors is connected to a break-over element defining a predetermined break-over voltage, said steps of triggering said at least two series-connected thyristors entails triggering each one of said at least two series-connected thyristors at an applied voltage exceeding said predetermined break-over voltage defined by said break-over element;

said step of generating said triggering channel fault signal entailing the steps of:

applying to a filter an electric valve current which flows through said electric valve after triggering said at least two series-connected thyristors;

filtering, by means of said filter, a harmonic from said electric valve current;

comparing said harmonic with a predetermined limiting harmonic value; and generating said triggering channel fault signal when said harmonic exceeds said predetermined limiting harmonic value.

14. In a process for fault monitoring an electric valve containing at least two series-connected thyristors, the process comprising the steps of:

triggering, during a blocked state of the electric valve, the at least two series-connected thyristors associated with a predetermined current direction with the exception of at least one thyristor to be tested of said at least two series-connected thyristors within a predetermined time interval;

detecting a valve current flowing through the electric valve during said predetermined time interval;

Presetting a current limit value for said detected valve current;

Comparing said detected valve current flowing through said electric valve during said predetermined time interval, with said preset current limit value; and Generating a fault signal indicative of a fault in said at least one thyristor to be tested whenever said detected valve current exceeds said preset current limit value;

in an electric valve in which each one of said at least two series-connected thyristors is connected to a break-over element defining a predetermined break-over voltage, said step of triggering said at least two series-connected thyristors entails triggering each one of said at least two series-connected thyristors at an applied voltage exceeding said predetermined break-over voltage defined by said break-over element;

said step of triggering said at least two series-connected thyristors includes triggering said at least two series-connected thyristors at a predetermined test triggering angle according to the equation:

$$\alpha_p = 180° - \arcsin((k \cdot n_p \cdot U_k)/(\sqrt{2} \cdot U)),$$

wherein k is a safety factor smaller than 1, $n_p$ the number of said at least one thyristor to be tested, $U_K$ said predetermined break-over voltage defined by said break-over element, and U an effective no-load voltage; and setting said safety factor at a value of k=0.7.

15. In a process for fault monitoring an electric valve containing at least two series-connected thyristors, the process comprising the steps of:

triggering, during a blocked state of the electric valve, the at least two series-connected thyristors associated with a predetermined current direction with the exception of at least one thyristor to be tested of said at least two series-connected thyristors within a predetermined time interval;

detecting a valve current flowing through the electric valve during said predetermined time interval;

Presetting a current limit value for said detected valve current;

Comparing said detected valve current flowing through said electric valve during said predetermined time interval, with said preset current limit value; and Generating a fault signal indicative of a fault in said at least one thyristor to be tested whenever said detected valve current exceeds said preset current limit value;

said step of triggering said at least two series-connected thyristors associated with said predetermined current direction entails applying a multiple number of triggering pulses for multiply triggering a plural number of said series-connected thyristors associated with said predetermined current direction and constituting said at least two series-connected thyristors;

during said multiple triggering operation, sequentially exempting from triggering, as said at least one thyristor to be tested, at least one of said plural number of said thyristors for testing in order to thereby sequentially test all of said plural number of series-connected thyristors during a cycle of triggering and testing operations; and carrying out at least once said cycle of triggering and testing operations.

16. In a process for fault monitoring an electric valve containing at least two series-connected thyristors, the process comprising the steps of:

triggering, during a blocked state of the electric valve, the at least two series-connected thyristors associated with a predetermined current direction with the exception of at least one thyristor to be tested of said at least two series-connected thyristors within a predetermined time interval; and detecting a valve current flowing through the electric valve during said predetermined time interval;

Presetting a current limit value for said detected valve current;

Comparing said detected valve current flowing through said electric valve during said predetermined time interval, with said preset current limit value; and Generating a fault signal indicative of a fault in said at least one thyristor to be tested whenever said detected valve current exceeds said preset current limit value;

during said step of triggering said at least two series-connected thyristors, applying to said at least two series-connected thyristor a triggering pulse having a duration in the range of 5 microseconds to 200 microseconds.

17. In a process for fault monitoring an electric valve containing at least two series-connected thyristors, the process comprising the steps of:

triggering, during a blocked state of the electric valve, the at least two series-connected thyristors associated with a predetermined current direction with the exception of at least one thyristor to be tested of said at least two series-connected thyristors within a predetermined time interval;

detecting a valve current flowing through the electric valve during said predetermined time interval;

Presetting a current limit value for said detected valve current;

Comparing said detected valve current flowing through said electric valve during said predetermined time interval, with said preset current limit value; and Generating a fault signal indicative of a fault in said at least one thyristor to be tested whenever said detected valve current exceeds said present current limit value;

in an electric valve in which each one of said at least two series-connected thyristors is connected to a break-over element defining a predetermined break-over voltage, said step of triggering said at least two series-connected thyristors entails triggering each one of said at least two series-connected thyristors at an applied voltage exceeding said predetermined break-over voltage defined by said break-over element;

delivering said triggering pulse once the electric valve reaches an electric valve voltage of at least 100 V; and selecting as said electric valve voltage, a value smaller than $k \cdot n_p \cdot U_K$, wherein k is a safety factor smaller than 1, $n_p$ the number of said at least one thyristor to be tested, and $U_K$ said predetermned break-over voltage defined by said break-over element.

18. The process as defined in claim 17, further including the step of:

setting said safety factor at a value of $k=0.7$.

* * * * *

UNITED STATES PATENT AND TRADEMARK OFFICE
CERTIFICATE OF CORRECTION

PATENT NO. : 4,884,025

DATED : November 28, 1989

INVENTOR(S) : MICHAEL HäUSLER

It is certified that error appears in the above-identified patent and that said Letters Patent is hereby corrected as shown below:

In the ABSTRACT, line 2, please delete "thyristore" and insert --thyristors--

Column 2, line 20, after "electric" please delete "view" and replace with --valve--

Column 3, line 32, after "n" please delete "perios" and replace with --periods--

Column 3, line 44, after "of" please delete "deliverately" and replace with --deliberately--

Column 3, line 45, after "and" please delete "$U_k$" and replace with --$U_K$--

Column 4, line 26, after "6" please insert --a-b--

Column 6, line 27, after "voltage" please delete "$U_{R(max)}/2$" and replace with --$U_{R(max)}/\sqrt{2}$--

Column 7, line 41, after "30," please delete "38" and replace with --28--

Column 7, line 48, after "FIGS." please delete "4" and replace with --4a)--

Column 7, line 48, please delete "6 and 7" and replace with --6a) and 7a)--

UNITED STATES PATENT AND TRADEMARK OFFICE
CERTIFICATE OF CORRECTION

PATENT NO. : 4,884,025

DATED : November 28, 1989

INVENTOR(S) : Michael Häusler

Page 2 of 3

It is certified that error appears in the above-identified patent and that said Letters Patent is hereby corrected as shown below:

Column 7, line 49, after "FIGS." please delete "4, 4, 6 and 7" and replace with --4b), 4c), 6b) and 7b)--

Column 8, line 14, after "FIGS." please delete "4" and replace with --4a)--

Column 8, line 15, please delete "4" and replace with --4b)--

Column 8, line 39, after "FIG." please delete "4" and insert --4c)--

Column 9, line 1, please delete "Tn'T2'..." and replace with --T2'... Tn'--

Column 9, line 5, please delete "$S_{U1}$"1"," and replace with --$S_{U1}$ = "1",--

Column 13, line 66, after "least" please insert --two--

UNITED STATES PATENT AND TRADEMARK OFFICE
CERTIFICATE OF CORRECTION

PATENT NO. : 4,884,025

DATED : November 28, 1989

INVENTOR(S) : Michael Häusler

It is certified that error appears in the above-identified patent and that said Letters Patent is hereby corrected as shown below:

Column 15, line 54, please amend the equation to read $$\alpha_p = 180° - \arcsin((k \cdot n_p \cdot U_K)/(\sqrt{2} \cdot U)),$$

Signed and Sealed this

Second Day of April, 1991

*Attest:*

HARRY F. MANBECK, JR.

*Attesting Officer*     *Commissioner of Patents and Trademarks*